(12) United States Patent
Mallenius

(10) Patent No.: US 6,407,713 B1
(45) Date of Patent: Jun. 18, 2002

(54) ALIGNMENT APPARATUS

(75) Inventor: Atte Mallenius, Kerava (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/701,541

(22) PCT Filed: May 27, 1999

(86) PCT No.: PCT/FI99/00461

§ 371 (c)(1),
(2), (4) Date: May 14, 2001

(87) PCT Pub. No.: WO99/63263

PCT Pub. Date: Dec. 9, 1999

(30) Foreign Application Priority Data

Jun. 1, 1998 (FI) .................................................. 98/1234

(51) Int. Cl.[7] .............................. H01Q 1/12; H01Q 3/08
(52) U.S. Cl. ......................... 343/765; 343/882; 343/890
(58) Field of Search ................................ 343/765, 882, 343/880, 881, 890; 248/183.1, 183.2, 218.4, 219.2; H01Q 3/00, 1/12, 3/08

(56) References Cited

U.S. PATENT DOCUMENTS 4,924,239 A 5/1990 Ceklovsky .................. 343/882
6,031,508 A * 2/2000 Ishizuka et al. ............. 343/882

FOREIGN PATENT DOCUMENTS

| DE | 3127855 | 6/1983 |
|---|---|---|
| EP | 0880195 | 11/1998 |
| FI | 90699 | 5/1988 |
| GB | 2228370 | 8/1990 |
| SE | 429374 | 8/1983 |

* cited by examiner

Primary Examiner—Michael C. Wimer
(74) Attorney, Agent, or Firm—Pillsbury Winthrop LLP

(57) ABSTRACT

The invention relates to an alignment apparatus, with which an instrument to be aligned is mounted on a supporting structure (S) and which comprises a body section (10) mounted on the supporting structure, vertically and horizontally alignable alignment sections (20, 30), of which the first is mounted on the body section and the second is used for mounting the instrument to be aligned, and horizontal and vertical alignment means (40, 50) to align the alignment sections. To facilitate the alignment, the alignment means comprise threaded bolts (40, 50) connecting sections turning in relation to each other, which bolts are arranged to turn in each section turning in relation to each other so that each end (41, 42 and 51, 52) of the threaded bolts projects from the turning sections and each projecting end is provided with means (43, 44, 53, 54) enabling the turning of the threaded bolts.

4 Claims, 3 Drawing Sheets

ALIGNMENT APPARATUS

This application is the national phase of international application PCT/FI99/00461 filed May 27, 1999 which designated the U.S., and that international application was published under PCT Article 21(2) in English.

BACKGROUND OF THE INVENTION

The invention relates to an alignment apparatus, with which an instrument to be aligned is mounted on a supporting structure and which comprises a body section to be mounted on the supporting structure, vertically and horizontally alignable alignment sections, of which the first is mounted on the body section and the second is used for mounting the instrument to be aligned, and horizontal and vertical alignment means to align the alignment sections.

The alignment apparatus is used especially in aligning an antenna (and a microwave radio) to a required direction towards another equivalent antenna (and radio) and in keeping the antenna exactly in the set direction, for instance during strong winds. The alignment apparatus is required to enable wireless data transmission, when the wireless data transmission network comprises several radio links with an alignment apparatus and a microwave radio. The alignment apparatus can be used in aligning all antennas, for instance satellite antennas. it can also be adapted to align mirrors and directors.

In such an alignment apparatus, horizontal coarse alignment is implemented when fastening the alignment apparatus to the supporting structure (pole) by mounting it in an approximately correct position. For vertical coarse alignment, the vertical alignment section usually has several initial positions to select from, and the initial setting is then adjusted with vertical fine adjustment.

Apparatus of prior art can be divided into two main groups on the basis of horizontal fine adjustment:

In the first group, the body section to be mounted on the supporting structure (pole) and the alignment sections affecting the horizontal adjustment form an entity which also swivels around the pole when fine adjustment is made. In this case, fine adjustment is greatly dependent on the surface roughness of the pole and the mounting elements and on the friction between the pole and the elements. This means that horizontal fine adjustment becomes unstable and turning the threaded bolt, at times, affects the adjustment and, at times, does not, making the adjustment pulse-like and jerky. Thus, the result is an irregular adjustment, making an exact alignment of an antenna difficult and time-consuming, sometimes even impossible.

In the second group, either the horizontal or vertical alignment section has been arranged to swivel or turn in relation to the body section to be mounted on the supporting structure, for instance so that the vertical alignment section turns vertically in relation to the body while the horizontal alignment section turns in the vertical alignment section. Generally, a disadvantage of such a structure is a small range for horizontal fine adjustment and the fact that to make fine adjustment, it is necessary to open several nuts and bolts before the adjustment and close them after it.

In both above-mentioned groups, several nuts and bolts need to be opened and closed to perform vertical fine adjustment.

As antennas are usually located 20 to 30 meters above land surface in places where wind is strong, installation and alignment conditions are difficult for an antenna installer. In addition to the difficult conditions and the above-mentioned complex adjustment, the installer must move several times from one side of the pole to the other, which requires time and adds to the difficulty and risks of the work.

BRIEF DESCRIPTION OF THE INVENTION

It is an object of the present invention to produce an alignment apparatus which does not have the above-mentioned problems. This object is achieved by an alignment apparatus of the invention which is characterized in that the alignment means comprise threaded bolts connecting sections turning in relation to each other. The bolts are arranged to turn in both sections in relation to each other so that both ends of the threaded bolts project from the turning sections and both projecting ends are provided with a part enabling the turning of the threaded bolts.

The invention is based on the idea that horizontal and vertical fine adjustment is possible from two opposite sides manually or with a machine, such as a battery drill with a wrench. These characteristics enable a quick fine adjustment. The number of nuts and bolts to be opened and closed is also substantially reduced (approximately 50% as compared to known solutions). At the same time, less tools are required. However, the important thing is that the invention considerably increases the safety of the installer, because he does not need to move around so much.

An advantage of the invention is also that if the antenna must be installed on the other side of the pole, the adjustments can still be made without disassembling parts of the alignment apparatus, because the alignment apparatus is 'symmetrical' due to the fact that adjustment can be made on two sides. The alignment apparatus can also be made compact, which enables its installation close to the pole.

BRIEF DESCRIPTION OF THE DRAWINGS

The invention will be described in greater detail with reference to the attached drawings using an embodiment in which.

DETAILED DESCRIPTION OF THE INVENTION

Figure 1:
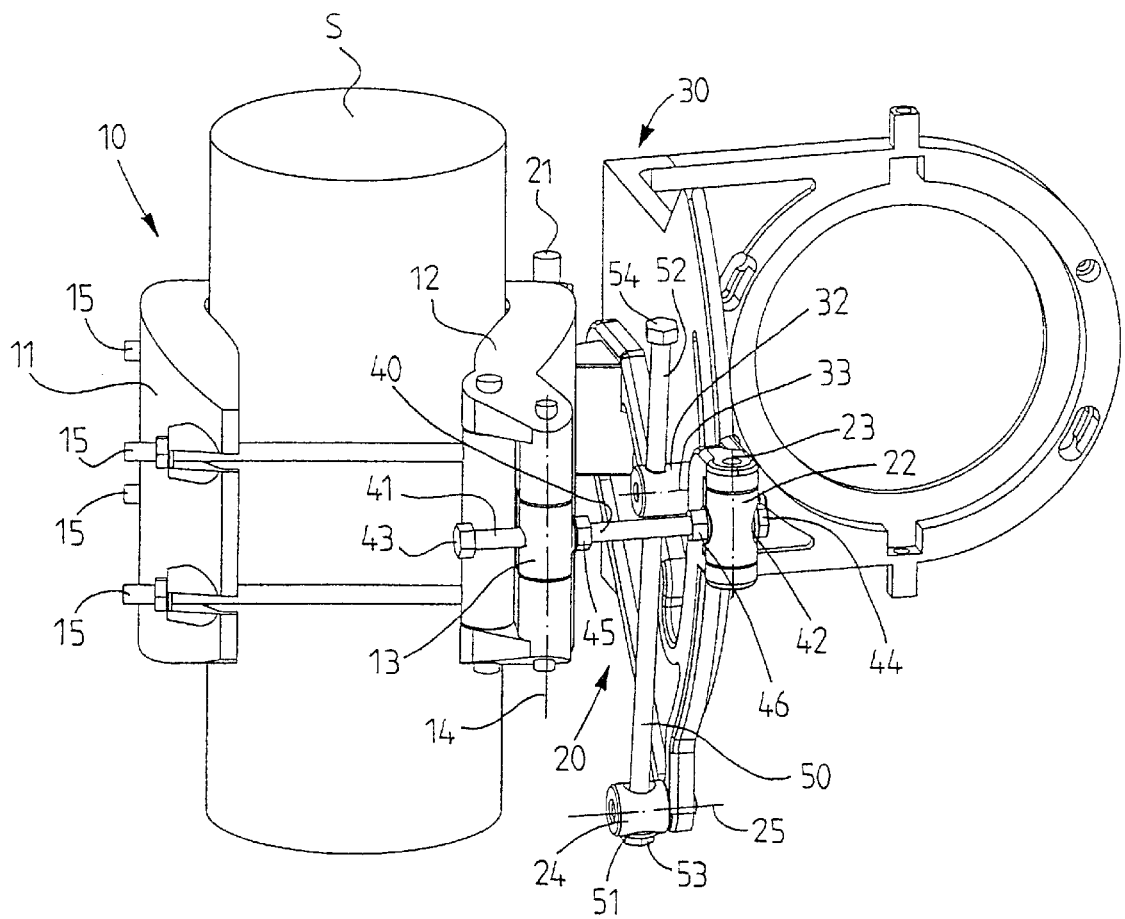
FIG. 1 shows an alignment apparatus of the invention from behind (in relation to the antenna to be mounted) and seen diagonally from above.
Figure 2:
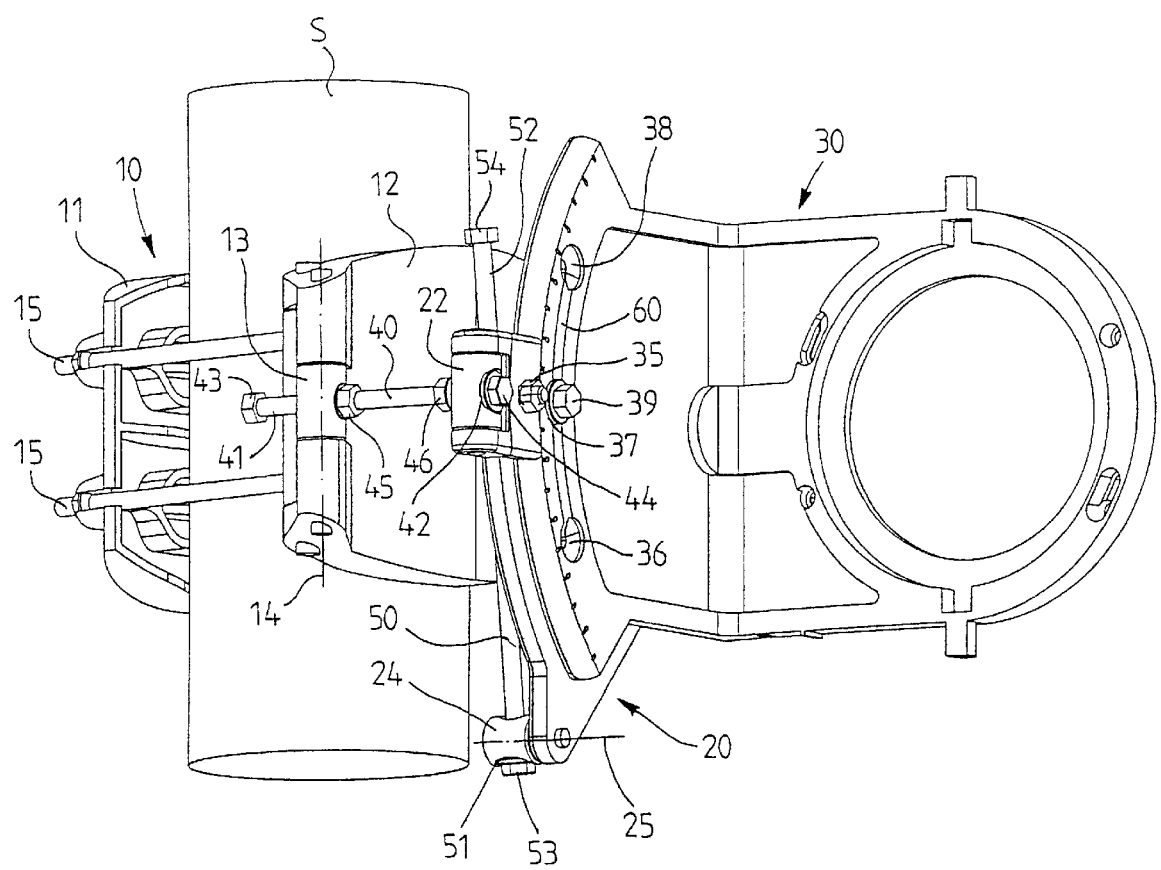
FIG. 2 shows an alignment apparatus of the invention from behind and seen diagonally from below.
Figure 3:
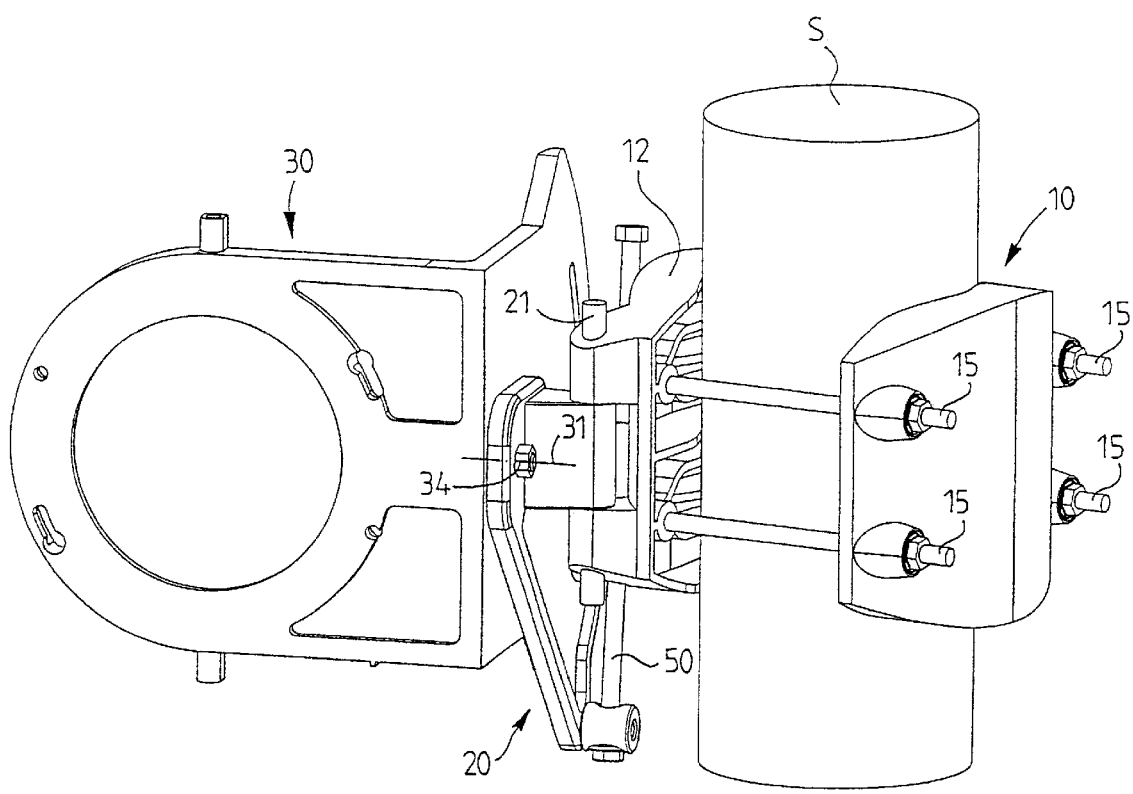
FIG. 3 shows an antenna of the invention from the front seen diagonally from above.

The alignment apparatus shown in the drawings comprises a body section 10 to be mounted on a supporting structure S, a horizontally alignable horizontal alignment section 20 mounted on the body section 10 and a vertically alignable vertical alignment section 30 mounted on the horizontal alignment section, on which vertical alignment section an antenna (not shown) or a corresponding apparatus is mounted, and horizontal alignment means 40 between the body section 10 and the horizontal alignment section 20, and, vertical alignment means 50 between the horizontal and vertical alignment sections 20, 30.

The body section 10 comprises two halves 11 and 12 which clamp on both sides of a pole S acting as a supporting structure and which are clamped round the pole S with four bolts 15 connecting the halves.

The horizontal alignment section 20 is mounted on the body section 10 to turn in relation to a vertical shaft 21 arranged between one half 12 and the horizontal alignment section 20, and the vertical alignment section 30 is mounted on the horizontal alignment section 20 with a bolt 31 arranged between them and to turn in relation to a horizontal shaft.

The alignment means 40 and 50 comprise a first and second threaded bolt 40 and 50 connecting the sections turning in relation to each other. The bolts are arranged to turn in relation to each other so that each end 41, 42 and 51, 52 of the threaded bolts 40 and 50 projects from the sections 10, 20, 30 turning in relation to each other, and each projecting end 41, 42 and 51, 52 is provided with a part enabling the turning of the threaded bolt, preferably with a nut end 43, 44 and 53, 54.

The first threaded bolt 40 connects the body section 10 and the horizontal alignment section 20 at a distance from their articulated shaft 21, and the second threaded bolt connects the horizontal and vertical alignment sections 20 and 30 at a distance from their articulated shaft 31.

A receiving section 13 of the first threaded bolt 40 in one half 12 of the body section 10 is arranged to turn in relation to a vertical shaft 14 in the half 12, and a receiving section 22 in the horizontal alignment section 20 is arranged to turn in relation to a vertical shaft 23 in the horizontal alignment section 20, while the bolt ends 41, 42 of the bolt 40 go through the receiving sections 13 and 22 as described above. Correspondingly, a receiving section 24 of the second threaded bolt 50 in the horizontal alignment section 20 is arranged to turn in relation to a horizontal shaft 25 and a receiving section 32 in the vertical alignment section 30 is arranged to turn in relation to a vertical shaft 33 in the vertical alignment section, while the bolt ends 51, 52 of the bolt 50 go through the receiving sections 24 and 32 as described above.

So as to make the inter-connected sections 10, 20, 30 to move closer, apart, or to turn by turning, i.e. adjusting, the threaded bolts 40, 50, the threads of the threaded bolt 40 are contrary in the receiving sections 13, 22 and the threads of the threaded bolt 50 are contrary in the receiving sections 24, 33.

To lock the horizontal fine adjustment setting, the first threaded bolt 40 is arranged with locking elements, preferably locking nuts 45, 46 adapted to press against the receiving sections 13, 22 of the threaded bolt 40 from the opposite side in relation to the nut ends 43, 44 and 53, 54 enabling the turning of the threaded bolt.

The locking of the vertical fine adjustment setting is implemented by means of a locking nut 34 of the articulated shaft 31 between the alignment sections and a separate locking device, i.e. locking nut 35, which locks the alignment sections to each other.

For vertical coarse alignment, the vertical alignment section 30 has, in this example, 3 holes 36 to 38 at a distance from each other on the turning circumference of the vertical alignment section, to which holes the second receiving section 32 of vertical fine adjustment can be locked at various initial angles of gradient with a bolt 39.

The alignment apparatus of the invention is aligned in the following way:

Horizontal coarse adjustment is made when fastening the alignment apparatus to the pole S, that is, by installing the body section 10 to the pole S approximately in the correct horizontal position either visually or by means of a finder (not shown) and then tightening the bolts 15.

After this, horizontal fine adjustment is made by first opening the locking nuts 45, 46 and then making the fine adjustment with the threaded bolt 40 at its either end 41, 42 with either a hand tool or a drill with bushing (not shown). After the correct direction is found, the locking nuts 45, 46 are locked. The coarse adjustment range is +/−180° and, correspondingly, the fine adjustment range is +/−15°.

Vertical coarse adjustment is made when the antenna needs to be deflected/aligned from its horizontal level more than +/−30°; in this case, coarse adjustment is made by first slightly opening (for instance ¼ turn) the nuts 34, 35 and then opening the bolt 39 as far as it opens while the built-in locking ring (not shown) stops the bolt 39 from opening too much and falling off. After this, a possible shaper plate 60 between the holes 36 to 38 is removed and the vertical alignment section 30 is moved to the required hole 36 to 38, then the shaper plate 60 is put back and the bolt 39 is tightened so that it can turn when fine adjustment is made (bolt 39 together with threaded bolt 50 and its receiving section 32).

Vertical fine adjustment is made by first slightly opening the nuts 34, 35, unless they are already open after the coarse adjustment. After this, fine adjustment can be made with the threaded bolt 50 at its either end 51, 52 with either a hand tool or a drill with bushing in the same way as in horizontal fine adjustment. After the correct direction is found, the nuts 34, 35 and 39 are locked. In this example, the coarse adjustment range is +/−45° and the fine adjustment range is +/−30°.

The above description of the invention is only intended to illustrate the basic idea of the invention. A person skilled in the art may implement its details in a variety of alternative ways within the scope of the attached claims.

What is claimed is:

1. An alignment apparatus for aligning an instrument mounted on a supporting structure comprising:

a body section mounted on the supporting structure;

vertically and horizontally alignable alignment sections of which the horizontally alignable alignment section is mounted on the body section and the vertically alignable alignment section is used for mounting the instrument to be aligned;

horizontal and vertical alignment means to align the alignment sections, wherein the horizontal and vertical alignment means comprise threaded bolts that connect sections which turn in relation to each other, the bolts are arranged to turn in the vertically and horizontally alignable alignment sections in relation to each other so that both ends of the threaded bolts project from the sections, that turn the projecting ends are provided with means enabling the turning of the threaded bolts; and wherein the horizontal alignment section is mounted on the body section to turn in relation to a vertical shaft arranged between them, and the vertical alignment section is mounted on the horizontal alignment section to turn in relation to a horizontal shaft between them, wherein a first threaded bolt connects the body section and the horizontal alignment section at a distance from the vertical shaft and a second threaded bolt connects the horizontal and vertical alignment sections at a distance from the horizontal shaft.

2. The alignment apparatus according to claim 1, wherein receiving sections of the first threaded bolt in the body section and horizontal alignment section are arranged to turn in relation to vertical shafts in the body section and horizontal alignment section, and receiving sections of the second threaded bolt in the horizontal and vertical alignment sections are arranged to turn in relation to horizontal shafts in the alignment sections.

3. The alignment apparatus as claimed in claim 2, wherein a horizontal fine adjustment setting is set when the first threaded bolt is, arranged with locking elements, adapted to press against the receiving sections of the first threaded bolt from the opposite side in relation to parts enabling the turning of the first threaded bolt, and a vertical fine adjustment setting is implemented by means of a locking device of the horizontal shaft between the alignment sections and a separate locking device which locks the alignment sections to each other.

4. The alignment apparatus according to claim 1, further comprising means for horizontal coarse alignment formed by the mounting of the body section on the supporting structure, and means for vertical coarse alignment in which the vertical alignment section can be set at different initial angles of gradient.

* * * * *